(12) United States Patent
de Backer et al.

(10) Patent No.: US 11,152,156 B2
(45) Date of Patent: Oct. 19, 2021

(54) LABEL AND RELATED METHOD

(71) Applicant: AVERY DENNISON RETAIL INFORMATION SERVICES, LLC, Mentor, OH (US)

(72) Inventors: Mathieu de Backer, Grottammare (IT); Barry Van Dyk, Ocean, NJ (US)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 0 days.

(21) Appl. No.: 16/294,304

(22) Filed: Mar. 6, 2019

(65) Prior Publication Data

US 2019/0279536 A1 Sep. 12, 2019

Related U.S. Application Data

(60) Provisional application No. 62/639,236, filed on Mar. 6, 2018.

(51) Int. Cl.
*H01G 4/30* (2006.01)
*H01G 4/248* (2006.01)
(Continued)

(52) U.S. Cl.
CPC .............. *H01G 4/30* (2013.01); *D02G 3/042* (2013.01); *D02G 3/045* (2013.01); *D02G 3/44* (2013.01);
(Continued)

(58) Field of Classification Search
CPC .......... D02G 3/042; D02G 3/045; D02G 3/44; G09F 3/02; G09F 2003/0223
See application file for complete search history.

(56) References Cited

U.S. PATENT DOCUMENTS

2003/0204235 A1* 10/2003 Edens ...................... A61F 2/06
623/1.5
2005/0187071 A1* 8/2005 Yamashita ......... A41D 13/1236
482/1
(Continued)

FOREIGN PATENT DOCUMENTS

WO 2008/089046 7/2008

OTHER PUBLICATIONS

Abdul Mofeda et al: "The Influence of Number of Filaments on Physical and Mechanical characteristics of Polyester Woven Fabrics", Life Science Journal, Apr. 25, 2012 (Apr. 25, 2012), XP055592514, Retrieved from the Internet: URL:http://www.lifesciencesite.com/lsj/life0903/012_9161life0903_79_83.pdf [retrieved on May 28, 2018].

(Continued)

*Primary Examiner* — Gary C Hoge

(57) ABSTRACT

A label and related method of manufacture that includes a fabric made of yarn, in either cut individual singles or continuous ribbon format in any length. The yarn includes a fiber that has been recycled, that is recyclable, that is organic, that is biodegradable, and/or that can be derived from a material that is known to be environmentally friendly. The yarn, in one embodiment, may include a fiber defined as "high filament count" material, above the current industry standard of 24 filaments, being in the range of 72 to 96 to 144 filaments or higher per individual yarn, in any denier range of 30 denier to 150 denier thickness, in natural raw white, optical dyed white, or dyed colors. These yarns can be independent of each other.

8 Claims, 3 Drawing Sheets

(51) Int. Cl.
  *H01G 4/12* (2006.01)
  *H01G 4/008* (2006.01)
  *D02G 3/04* (2006.01)
  *D02G 3/44* (2006.01)
  *G09F 3/02* (2006.01)

(52) U.S. Cl.
  CPC ............... *G09F 3/02* (2013.01); *H01G 4/008* (2013.01); *H01G 4/1227* (2013.01); *H01G 4/1245* (2013.01); *H01G 4/248* (2013.01); *G09F 2003/0223* (2013.01)

(56) References Cited

U.S. PATENT DOCUMENTS

| | | | |
|---|---|---|---|
| 2006/0154058 A1* | 7/2006 | Neuberg | D01F 1/10 428/364 |
| 2007/0166503 A1* | 7/2007 | Hannigan | A41D 31/02 428/59 |
| 2009/0176056 A1 | 7/2009 | Marin et al. | |
| 2009/0270012 A1* | 10/2009 | Melarti | A41C 1/06 450/8 |
| 2010/0124637 A1* | 5/2010 | Stiel | G09F 3/02 428/193 |
| 2011/0146017 A1* | 6/2011 | Wildeman | D04B 21/165 15/209.1 |
| 2012/0251597 A1 | 10/2012 | Gupta et al. | |
| 2012/0252105 A1* | 10/2012 | Ahrens | C12M 21/02 435/257.3 |
| 2013/0183480 A1* | 7/2013 | Rock | D03D 15/0077 428/91 |

OTHER PUBLICATIONS

International Search Report and Written Opinion dated Jun. 19, 2019 issued in corresponding IA No. PCT/US2019/020944 filed Mar. 6, 2019.

International Preliminary Report on Patentability dated Sep. 8, 2020 issued in corresponding IA No. PCT/US2019/020944 filed Mar. 6, 2019.

* cited by examiner

LABEL AND RELATED METHOD

CROSS REFERENCE TO RELATED APPLICATION(S)

The present application claims priority to and the benefit of U.S. provisional utility patent application No. 62/639,235 filed Mar. 6, 2018, which is incorporated herein by reference in its entirety.

BACKGROUND

Currently, in the marketplace, printed fabric labels are made of conventional yarns that are derived from synthetic fibers or natural fibers, i.e., fibers that are derived from materials grown using chemical fertilizers and/or pesticides. The base materials and the processes used to manufacture these conventional yarns have a negative impact on the environment. Furthermore, the resulting printed fabric labels, that are non-recyclable and non-biodegradable, can have a negative impact on the environment. It should, therefore, be appreciated that there is a need for labels that have less of an impact on the environment. The present invention satisfies this need.

SUMMARY

The present invention includes labels that have little effect on the environment. An exemplary embodiment is a label that includes a fabric made of yarn. The yarn includes a fiber that has been recycled, that is recyclable, that is organic, that is biodegradable, and/or that has been derived from a material that is known to be environmentally friendly.

In other, more detailed features of the invention, the label is a printed label. Also, the fabric can be a woven-edge narrow fabric or a slit-edge broad good fabric. In addition, the label can be a printed label, where the fabric is printed with a standard ink, a soy-based ink, a water-based ink, and/or an ink that is known to be environmentally friendly.

In other, more detailed features of the invention, the yarn may be derived from soy, bamboo, plant fiber, recycled polyester, cellulose-based fiber, natural fiber, and/or organically grown cotton. Also, the yarn can include a blend of a first yarn and a second yarn, where the first yarn is a standard synthetic polyester yarn and/or a natural cotton yarn, and the second yarn is derived from soy, bamboo, plant fiber, recycled polyester, cellulose-based fiber, organically grown cotton, and/or natural fiber.

In other, more detailed features of the invention, the fabric is a dyed fabric, and the fabric has been dyed using an environmentally friendly dye and/or an environmentally friendly dyeing process. Also, the fabric can be dyed using a custom color.

In other, more detailed features of the invention, the label is recyclable and/or biodegradable. Also, the label can further include locations having yarn fiber blends that are configured to facilitate fusing and/or sealing. In addition, the words "environmentally friendly" mean considered to minimize the impact on, or inflict little to no harm on, the environment.

Another exemplary embodiment is a printed label that includes a fabric made of yarn. The yarn is derived from soy, bamboo, plant fiber, recycled polyester, cellulose-based fiber, organically grown cotton, and/or natural fiber. The yarn includes a fiber that has been recycled, that is recyclable, that is organic, that is biodegradable, and/or has been derived from a material that is known to inflict little to no harm on the environment. The fabric is printed with a standard ink, a soy-based ink, a water-based ink, and/or an ink that is known to inflict little to no harm on the environment.

An exemplary method according to the invention is a method for manufacturing a fabric to be used in a label. The method includes using yarn to create the fabric. The yarn includes a recycled fiber, a recyclable fiber, an organic fiber, a biodegradable fiber, and/or a fiber that has been derived from a material that is known to be environmentally friendly. In other, more detailed features of the invention, the fabric is manufactured using a Jacquard Broad loom and/or a Jacquard Needle loom.

Other features of the invention should become apparent to those skilled in the art from the following description of the preferred embodiments taken in conjunction with the accompanying drawings, which illustrate, by way of example, the principles of the invention, the invention not being limited to any particular preferred embodiment(s) disclosed.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

Unless otherwise indicated, the illustrations in the above figures are not necessarily drawn to scale.

DETAILED DESCRIPTION

Aspects of the invention are disclosed in the following description and related drawings directed to specific embodiments of the invention. Alternative embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Figure 1:
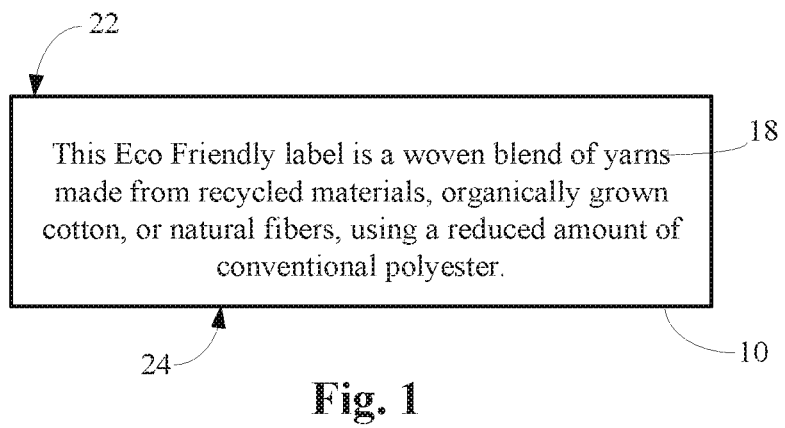
FIG. 1 shows a top plan view of a label according to an exemplary embodiment.
Figure 2:
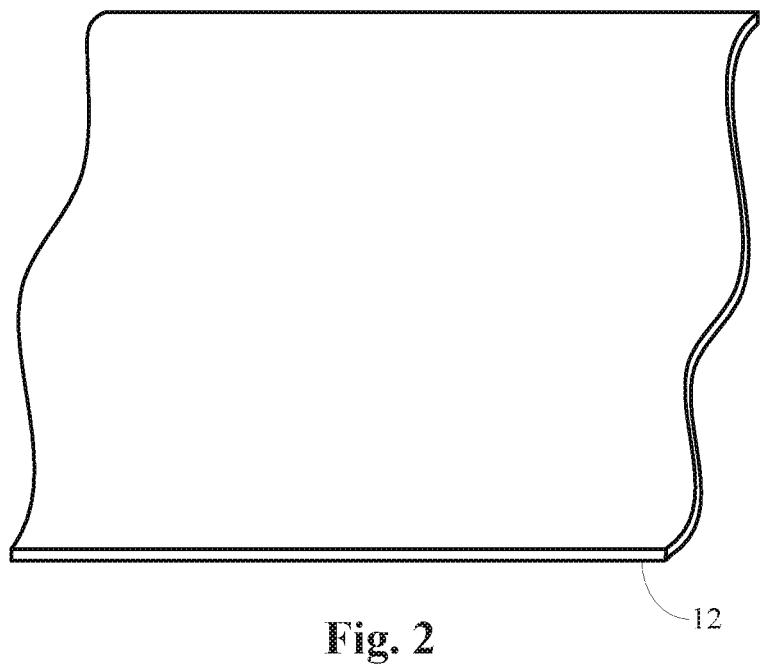
FIG. 2 shows a perspective view of a piece of fabric according to an exemplary embodiment.
Figure 3:
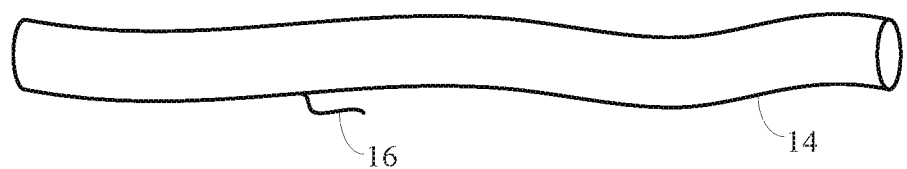
FIG. 3 shows a perspective view of a piece of yarn and a fiber that is coupled to the piece of yarn according to an exemplary embodiment.

Referring to FIGS. 1-3, the present invention is embodied in printed fabric labels 10 that are produced from fabric 12, for example, on woven-edge narrow fabrics or slit-edge broadcloth fabrics. These fabrics may include warp and/or fill yarns 14 that are constructed using some percentage of fibers 16 (from a percentage greater than 1% and up to 100%) that are recycled, recyclable, organic, biodegradable, or derived from natural or synthetic fibers that are known to be environmentally friendly. In one embodiment of the present invention, the label is constructed out of an individual cut single format or continuous ribbon format in any length presently contemplated in the art. The individual cut single labels are defined as having a predetermined size and formatted label which may be provided in a cut sheet or roll format and used for an individual label configuration or as part of a larger multipart label construction. The labels either provided in cut individual singles or a continuous ribbon format may be any length, such as, but not limited to, from 10.0 mm to 400-500 mm long (if manually cut) and continuous roll goods may be any specific: length.

Organic fibers utilized in the presently disclosed labels may be derived from organically grown materials, i.e., materials that are grown without the use of chemical fertilizers and/or chemical pesticides. These fabric labels can be printed with ink 18, for example, either standard inks, soy-based inks, water-based ink, or other inks that are known to be environmentally friendly. Examples of standard inks include, but are not limited to, the following: COLORMAX® inks from Avery Dennison Corporation of Pasadena, Calif., TEXPRINT inks for rotary letter presses from Ink Tec Inc. of Newton, N.C., and FABRIFAST® and DT TYPE letterpress inks from Perfectos Specialty Inks Ltd. of Nottingham, England. Throughout this document, the words "environmentally friendly" are synonymous with the words "environmentally acceptable" and mean designed to minimize the impact on, or cause or inflict little or no harm to, the environment. Advantageously, environmentally friendly items, e.g., environmentally friendly materials, yarns, fibers, inks, dyes, dye color, and dyeing processes, have less of an impact on the environment in comparison to corresponding conventional items. These printed fabric labels are used for brand identification of both "soft-line" and "hard-line" commercial retail goods. The labels can be of varying sizes and shapes, for example, although not shown to scale, the rectangular label shown in FIG. 1 can be approximately 24 millimeters by approximately 72 millimeters.

In one embodiment of the present invention, the yarns may include a fiber defined as "high filament count" material. The present invention contemplates that the high filament count material may be either a virgin or sustainable yarn material or a combination of both materials in varying percentages. The "high filament count material" suggests the material is above the current industry standard of at least twenty-four (24) filaments, being in the range of 72 to 96 to 144 filaments, in any denier range of 30 to 150 denier thickness. The high filament count material may be in natural raw white, optical dyed white or any color currently known in the art. The yarns may be independent of one another or combined.

Further, in addition to being of varying sizes and shapes, the labels may be formed from any sort of weaving technique using yarn having any material properties, such as any count grading. For example, in certain exemplary embodiments, a woven label may be formed from warp and weft threads, each of the warp and weft threads having a particular count grading. The threads may be formed from, for example, any standard grade of weft yarn, which may, for example, be 50 DTEX (Decitex) polyester having 24 filaments and 120 twists, 70 DTEX polyester having 24 filaments and 150 twists, or 110 DTEX polyester having 48 filaments and 120 twists. (It is noted that DTEX is an abbreviation for the count grading system for filament and spinning yarns recognized by all international bodies in the man-made fibers industry, with the "decitex" unit being a tenth of a "tex" unit, the "tex" unit defining a mass of yarn in grams per 1000 meters length, such that, for example, 110 DTEX polyester yarn is more than twice as heavy as 50 DTEX yarn.) According to some exemplary embodiments, such woven labels as described above, or any other exemplary embodiments of woven labels, may commonly be formed from polyesters such as virgin or recycled polyesters, but may be formed from other materials or combinations of materials such as may be desired.

According to an exemplary embodiment, other yarns than conventional yarns, such as yarn constructions like micro- and nano-yarns that may typically be reserved for the higher-end fashion industry, may be used instead or may be used in addition to conventional warp and weft yarns. Micro-yarns and nano-yarns may be, respectively, yarns formed from microfibers and yarns formed from nanofibers; microfibers may be most commonly defined, for example, as being fibers close to or finer than 1 DTEX or one "denier" (a "denier" being defined as the mass of yarn in grams over a length of 9000 meters, so effectively nine-tenths of a decitex, the mass of yarn in grams over a length of 10,000 meters), while nanofibers may be most commonly defined as being fibers having a width close to or finer than 100 nanometers (0.1 μm). It is contemplated, however, that "microfibers" and "nanofibers" that fall outside of this range may also be used in some exemplary embodiments or that "micro-yarns" or "nano-yarns" may be formed from such "microfibers" and "nanofibers," such as may be desired.

It may also be contemplated that "microfiber" or "nanofiber," or "microyarn" or "nanoyarn" may be defined according to other criteria; for example, according to an exemplary embodiment, microyarn (such as micro polyester yarn) may be defined as yarn constructed out of very fine filaments, most commonly 0.7 to 0.3 DPF, with DPF standing for "denier per filament" and being computed based on the total denier of the yarn divided by the quantity of uniform filaments, such that a higher number of filaments results in a lower DPF. According to such a definition, microyarn may be defined as, for example, having a minimum of 60 filaments per thread, while nanoyarn may have the filaments be reduced in size still further and may have upwards of 96 filaments per thread. A "blended" option includes a combination of recycled yarns and the nanoyarn can be offered.

Softer, thinner polyester yarn with nanofiber added provides customers with a fabric label alternative who are looking to change and/or elevate from pad printing labels, heat transfer labels or printed fabric labels, with a similar level of comfort functionality. The combination has a high filament rate over 100, but a low density which makes it more cost effective and soft and light. Lower cost tier ranges are possible within the product line.

In some exemplary embodiments, microfibers and nanofibers may be formed into labels by weaving together warps and wefts, akin to conventional fibers. It may be noted that forming microfiber and nanofiber labels in this manner may make use of high-quality weaving warps, due to the smaller amount of force that may be necessary in order to break a microfiber filament during warping; typically, microfiber weft yarns must be inserted with the greatest of care. As such, machinery such as air jet and rapier looms may typically be used for microfilament woven fabric production, and machinery such as rewinding units and yarn brakes may typically be used for processing filament yarns for weft insertion. An absolute tension sensor may be incorporated into the warp feed mechanism so as to avoid damage. Other solutions may further be incorporated such as may be desired.

In some exemplary embodiments, labels formed from microfibers (or nanofibers or nanoyarns) may have any yarn structure, may make use of any yarn production technology, may use yarn of any diameter, may use yarn having any yarn twist, may use yarn having any hairiness, may use, for example, staple or filament yarn, may use fibers of any fineness, may use fibers of any cross-section, and may have any yarn packing density, such as may be desired. For example, according to an exemplary embodiment, both microyarns and nanoyarns may be formed from polyester, such as, for example, virgin or recycled polyester or some combination of the two.

According to some exemplary embodiments, the use of microyarns or nanoyarns may have certain benefits. It may be noted, for example, that the bendability and torsional stiffness of fabric is inversely proportional to fiber diameter; as such, labels formed from microyarn or nanoyarn may be extremely flexible and very soft. Since microfibers and nanofibers have a quick stress relief, microfiber and nanofiber labels may also resist wrinkling and retain shape. Further, microyarn and nanoyarn may be highly absorbent, which may particularly be the case based on how the microyarn or nanoyarn is structured. For example, microyarn or nanoyarn may be structured to make use of split filaments formed into the threads of the microfiber or nanofiber, which may increase the surface area of the yarn and thus enhance the quality of printed fabrics, making printed labels clearer and sharper.

Embodiments of printed labels 10 on woven-edge narrow or slit-edge broad fabrics 12 using yarn fiber blends in the warp and fill include standard synthetic polyester or natural cotton yarns 14 combined with various amounts of some or all of the following: yarns derived from organically grown cotton, yarns derived from soy, yarns derived from bamboo, and yarns derived from other plant fibers. Additional embodiments of printed labels include standard synthetic polyester or natural cotton yarns combined with various amounts of some or all of the following: yarns made from recycled polyester, and yarns made from cellulose-based fibers such as Lyocell®, which is made by Lenzing Fibers Inc. of New York, N.Y. Further embodiments of printed labels include 100% of the following: yarns derived from organically grown cotton, yarns derived from soy, yarns derived from bamboo, yarns derived from plant fibers, yarns made from recycled polyester, and yarns made from cellulose-based fibers such as Lyocell®.

Other embodiments of labels 10 that have been printed on woven-edge narrow or slit-edge broad fabrics 12 also have been dyed using dyes and/or dyeing processes that are known to be environmentally friendly. These dyed labels use yarn fiber blends in the warp and fill that include standard synthetic polyester or natural cotton yarns 14 combined with various amounts of some or all of the following: yarns derived from organically grown cotton, yarns derived from soy, yarns derived from bamboo, and yarns derived from other plant fibers. Also, these dyed labels can include standard synthetic polyester or natural cotton yarns combined with various amounts of some or all of the following: yarns made from recycled polyester, and yarns made from cellulose-based fibers such as Lyocel or RTM. Furthermore, these dyed labels can include 100% of the following: yarns derived from organically grown cotton, yarns derived from soy, yarns derived from bamboo, yarns derived from plant fibers, yarns made from recycled polyester, and yarns made from cellulose-based fibers such as Lyocell®.

Embodiments of labels 10 are printed on woven-edge narrow or slit-edge broad fabrics 12 using inks 18 that are soy-based, water-based, or inks known to be environmentally friendly, and the fabrics include yarn fiber blends in the warp and fill including standard synthetic polyester or natural cotton yarns 14 combined with various amounts of some or all of the following: yarns derived from organically grown cotton, yarns derived from soy, yarns derived from bamboo, and yarns derived from other plant fibers. Embodiments of the ink-printed labels can include fabrics having standard synthetic polyester or natural cotton yarns combined with various amounts of some or all of the following: yarns made from recycled polyester, and yarns made from cellulose-based fibers such as Lyocell®. Additionally, embodiments of the ink-printed labels can include 100% of the following: yarns derived from organically grown cotton, yarns derived from soy, yarns derived from bamboo, yarns derived from plant fibers, yarns made from recycled polyester, and yarns made from cellulose-based fibers such as Lyocell®.

Figure 4:
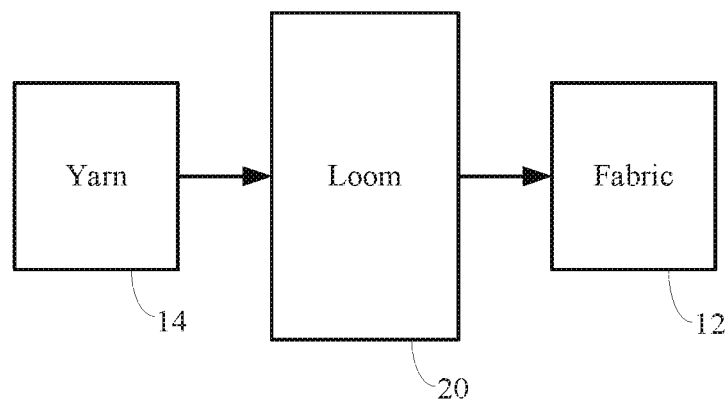
FIG. 4 shows a block diagram of yarn being input to a loom that outputs fabric according to an exemplary embodiment.

Embodiments include labels 10 that are printed on woven-edge narrow or slit-edge broad fabrics 12 that are recyclable and/or are biodegradable. Referring additionally to FIG. 4, the labels, for example, woven narrow fabric labels, can be produced using a loom 20, for example, a Jacquard Broad loom or a Needle loom. Also, the labels can be produced using yarn fiber blends in the warp and weft that consisting of standard synthetic polyester yarns combined with various amounts of and/or all consisting of natural fiber yarns having qualities known to be environmentally friendly. Woven Jacquard fabric labels manufactured from man-made synthetic fibers are often deemed harmful to the environment, while organically grown or natural fibers 16, as well as fibers from recycled materials, are all considered friendlier to the environment.

Embodiments of woven narrow fabric labels 10 that are produced in Jacquard Broad or Needle looms 20 using yarn fiber blends in the warp and weft can, for example, include standard synthetic polyester yarns 14 combined with various amounts of, and/or all of, the following natural fiber yarns having qualities that are known to be environmentally friendly: yarns derived from organically grown cotton, yarns derived from soy, and yarns derived from bamboo. The embodiments of woven narrow fabric labels that are produced in Jacquard Broad looms or Needle looms using yarn fiber blends in the warp and weft can, for example, include standard synthetic polyester yarns combined with various amounts of and/or all of the following man-made fiber yarns having qualities that are known to be environmentally friendly: polyester yarns manufactured from recycled substances, and yarns derived from cellulose, known as Lyocell®. In further example embodiments of woven narrow fabric labels that are produced in Jacquard Broad looms or Needle looms using yarn fiber blends in the warp and weft, the labels can include 100% natural fiber blends of yarns, excluding any synthetic polyester or any type of man-made fiber, using combinations of the following yarns that are known to be environmentally friendly: yarns derived from organically grown cotton, yarns derived from soy, and yarns derived from bamboo.

Embodiments of woven narrow fabric labels 10 that are produced in Jacquard Broad or Needle looms 20 using yarn fiber blends consisting of dyes and/or dyeing processes that are known to be environmentally friendly in the warp and weft can include standard synthetic polyester yarns 14 combined with various amounts of, and/or all of, the following natural fiber yarns having qualities that are known to be environmentally friendly, which have been dyed in "custom" colors using environmentally friendly dyes and/or dyeing processes: yarns derived from organically grown cotton, yarns derived from soy, and yarns derived from bamboo. Additional embodiments of woven narrow fabric labels that are produced in Jacquard Broad looms or Needle looms using yarn fiber blends consisting of dyes and/or dyeing processes that are known to be environmentally friendly in the warp and weft can include standard synthetic polyester yarns combined with various amounts of and/or all of the following man-made fiber yarns having qualities that are known to be environmentally friendly, which have been dyed in "custom" colors using environmentally friendly dyes and/or dyeing processes: polyester yarns manufactured from recycled substances, and yarns derived from cellulose, known as Lyocel®. Further embodiments of woven narrow fabric labels that are produced in Jacquard Broad looms or Needle looms using yarn fiber blends consisting of dyes and/or dyeing processes that are known to be environmentally friendly in the warp and weft can include 100% natural fiber blends of yarns, excluding any synthetic polyester or any type of man-made fiber, using combinations of the following yarns having qualities that are known to be environmentally friendly, which have been dyed in "custom" colors using environmentally friendly dyes and/or dying processes: yarns derived from organically grown cotton, yarns derived from soy, and yarns derived from bamboo.

Embodiments of woven narrow fabric labels 10 that are produced in Jacquard Broad or Needle looms 20 can include yarn fiber blends in specific locations, e.g., a first example location 22 and a second example location 24, of the label construction to ensure proper fusing/sealing at the point of the cutting area. These embodiments that ensure proper fusing/sealing can use natural fiber warp yarns 14 known to be environmentally friendly and that, for example, can include 100% natural fiber warp yarns that are known to be environmentally friendly combined with weft yarns either being synthetic or from recycled materials, which are woven specifically only in the cutting area 22 and 24 for approximately 3 mm-6 mm wide, from selvedge to selvedge, to ensure proper fusing/sealing of the heat cut edge. The warp and/or weft yarns can be derived from soy, bamboo, and/or organically grown cotton.

Figure 5:
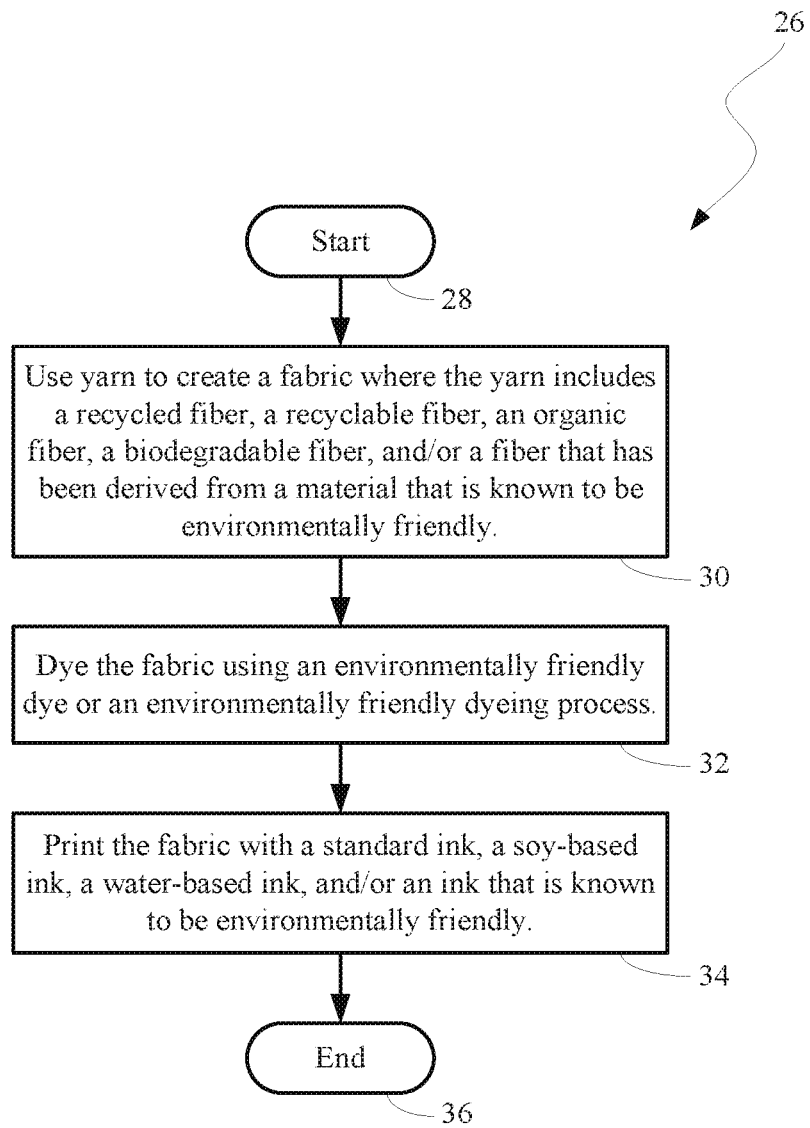
FIG. 5 is a flowchart of an example method for manufacturing a fabric to be used in a label according to an exemplary embodiment.

An exemplary method for manufacturing at least one fabric 12 to be used in a label 10 according to the present invention is illustrated in the algorithm 26 of FIG. 5. After starting the method at step 28, the next step 30 is to use at least one yarn 14 to create the at least one fabric, where the yarn includes a recycled fiber, a recyclable fiber, an organic fiber, a biodegradable fiber, and/or a fiber that has been derived from a material that is known to be environmentally friendly 16. Next, at step 32, the fabric is dyed using an environmentally friendly dye or an environmentally friendly dyeing process. Next, at step 34, the fabric is printed with a standard ink, a soy-based ink, a water-based ink, and/or an ink that is known to be environmentally friendly 18. The method ends at step 36.

The label set forth in the present invention may be a single layer label or a multi-layer label. In one embodiment of the present invention, the label is an integrated tubular construction which may comprise an adhesive hot melt laminated backing with an integrated adhesive hot melt yarn. In one embodiment present contemplated, the construction may include a non woven polyester fleece or paper backing such as, but not limited to a pressure sensitive peel and stick backing.

All features disclosed in the specification, including the claims, abstract, and drawings, and all of the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

What is claimed is:

1. A label comprising:
    at least one yarn that is constructed from fibers, wherein the fibers are recyclable, organic biodegradable, and/or derived from natural or synthetic fibers; and
    such that at least one of the fibers is a high filament count material that is greater than twenty-four (24) filaments;
    wherein the at least one yarn includes microfibers and nanofiber that are formed by weaving together warps and wefts.

2. The label of claim 1, wherein the at least one yarn is a micro yarn.

3. The label of claim 1, wherein the at least one yarn is a nano-yarn.

4. The label of claim 1, wherein the label is constructed using individual cut singles.

5. The label of claim 1, wherein the fibers are woven-edge narrow.

6. The label of claim 1, wherein the at least one yarn is derived from soy, bamboo, and/or organically grown cotton.

7. The label of claim 1, wherein the high filament count is in the range of 72 to 96 filaments.

8. The label of claim 1, wherein the high filament count is in a range of 30 to 150 denier thickness.

* * * * *